(12) United States Patent
Trenkle et al.

(10) Patent No.: US 9,555,511 B2
(45) Date of Patent: Jan. 31, 2017

(54) APPARATUS FOR THE ASSEMBLY AND DISASSEMBLY OF HYDRAULIC CYLINDERS

(71) Applicants: ZEPPELIN BAUMASCHINEN GMBH, Garching (DE); Martin Trenkle, Dachau (DE)

(72) Inventors: Martin Trenkle, Dachau (DE); Werner Luidl, Unterschleißheim (DE)

(73) Assignees: Zeppelin Baumaschinen GmbH, Garching (DE); Martin Trenkle, Dachau (DE)

( * ) Notice: Subject to any disclaimer, the term of this patent is extended or adjusted under 35 U.S.C. 154(b) by 0 days.

(21) Appl. No.: 14/758,880

(22) PCT Filed: Dec. 24, 2013

(86) PCT No.: PCT/EP2013/077967
§ 371 (c)(1),
(2) Date: Jul. 1, 2015

(87) PCT Pub. No.: WO2014/108313
PCT Pub. Date: Jul. 17, 2014

(65) Prior Publication Data
US 2015/0336225 A1    Nov. 26, 2015

(30) Foreign Application Priority Data

Jan. 10, 2013  (DE) .................... 10 2013 000 319
Jan. 31, 2013  (DE) .................... 10 2013 001 675

(51) Int. Cl.
*B23P 19/04*    (2006.01)
*B23P 19/02*    (2006.01)
(Continued)

(52) U.S. Cl.
CPC .............. *B23P 19/04* (2013.01); *B23P 19/022* (2013.01); *B23P 19/043* (2013.01); *B23P 19/10* (2013.01);
(Continued)

(58) Field of Classification Search
CPC ......... B23P 19/02; B23P 19/022; B23P 19/04; B23P 19/043; B23P 19/10; B23Q 1/265; Y10T 29/53687
See application file for complete search history.

(56) References Cited

U.S. PATENT DOCUMENTS

| | | | | |
|---|---|---|---|---|
| 1,535,367 A | * | 4/1925 | Little .................... | B29C 31/002 29/240 |
| 1,619,281 A | * | 3/1927 | White ..................... | B23Q 1/72 82/117 |

(Continued)

FOREIGN PATENT DOCUMENTS

| | | | | |
|---|---|---|---|---|
| CN | 201442170 | | 4/2010 | ............ B23P 19/027 |
| CN | 202224914 | | 5/2012 | ............ B23P 19/027 |

(Continued)

OTHER PUBLICATIONS

The Notification Concerning Transmittal of International Preliminary Report on Patentability (Chapter I of the Patent Cooperation Treaty), in English, dated Jul. 23, 2015, the International Preliminary Report on Patentability with the Written Opinion of the International Searching Authority, in English, dated Apr. 2, 2014, and the International Search Report, in English, dated Apr. 2, 2014, which were issued by the International Bureau of WIPO for Applicants' corresponding PCT application having Serial No. PCT/EP2013/077967, filed on Dec. 24, 2013.

*Primary Examiner* — Joseph J Hail
*Assistant Examiner* — Tyrone V Hall, Jr.
(74) *Attorney, Agent, or Firm* — Bodner & O'Rourke, LLP; Gerald T. Bodner; Christian P. Bodner

(57) ABSTRACT

The invention relates to an apparatus for the assembly and disassembly of hydraulic cylinders, composed of a pedestal-
(Continued)

Figure 1:
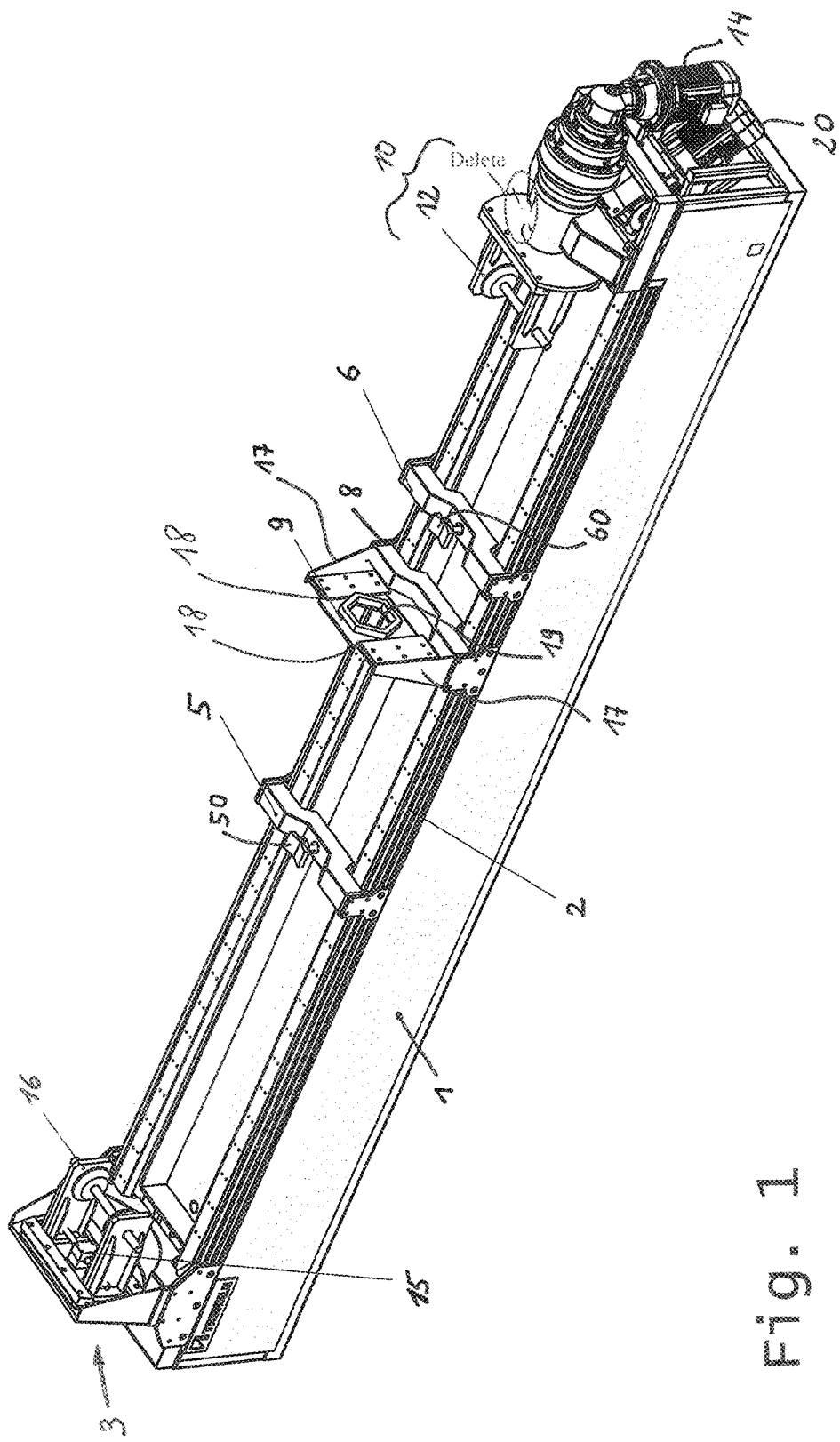

like machine frame having horizontally arranged guide means which bear, in displaceable manner, a receptacle for the cylinder barrel of the hydraulic cylinder, at least one receptacle for a support and a receptacle for a tool, and furthermore having a holder for fixing the piston rod of the hydraulic cylinder. According to the invention, the holder for fixing the piston rod has a centering carriage which is driven by a centering spindle and which comprises a piston rod receptacle, wherein the holder is designed to be rotatable about the longitudinal axis of the machine frame and the rotational movement is realized by means of a torque-controlled electromotive drive.

11 Claims, 3 Drawing Sheets

(51) Int. Cl.
  *B23P 19/10* (2006.01)
  *F15B 15/14* (2006.01)
(52) U.S. Cl.
  CPC .......... *F15B 15/14* (2013.01); *Y10T 29/53687* (2015.01)

(56) References Cited

U.S. PATENT DOCUMENTS

| | | | | |
|---|---|---|---|---|
| 2,473,306 A * | 6/1949 | Schreiber | ............ | B23B 3/30 29/27 B |
| 3,882,590 A * | 5/1975 | Mazelsky | ............ | B23P 19/04 29/434 |
| 3,900,938 A * | 8/1975 | Blomgren, Sr. | ........ | B23P 19/04 29/240 |
| 3,967,363 A * | 7/1976 | Meyer | ............ | B23P 19/08 29/235 |
| 4,092,881 A * | 6/1978 | Jurgens | ............ | B23P 19/061 29/240 |
| 4,190,940 A * | 3/1980 | Lawrence | ............ | F03G 7/06 29/405 |
| 4,295,257 A * | 10/1981 | Strohs | ............ | B23P 19/04 269/43 |
| 4,723,348 A * | 2/1988 | Jaminet | ............ | B23P 19/06 29/240 |
| 5,031,297 A * | 7/1991 | Nelson | ............ | B23P 11/022 29/234 |
| 6,164,165 A * | 12/2000 | Browning | ............ | B23P 19/04 29/240 |
| 8,468,666 B2 * | 6/2013 | Neubert | ............ | B29C 31/002 29/234 |
| 2003/0135995 A1 * | 7/2003 | Glasson | ............ | F15B 15/283 29/832 |

FOREIGN PATENT DOCUMENTS

| | | | | |
|---|---|---|---|---|
| DE | 3712961 | | 11/1988 | ............ B23P 19/02 |
| WO | WO 2014085552 A1 * | | 6/2014 | ............ B23P 19/022 |

* cited by examiner

APPARATUS FOR THE ASSEMBLY AND DISASSEMBLY OF HYDRAULIC CYLINDERS

The present invention relates to an apparatus for the assembly and disassembly of hydraulic cylinders, composed of a pedestal-like machine frame having horizontally arranged guide means which bear, in displaceable manner, a receptacle for the cylinder barrel of the hydraulic cylinder, at least one receptacle for a support and a receptacle for a tool, and furthermore having a holder or fixture for fixing the piston rod of the hydraulic cylinder according to the generic clause of claim 1.

U.S. Pat. No. 4,723,348 B already discloses a device for fixing a hydraulic cylinder for repair of the same. This device consists of a beam-like frame comprising a receiving means for the hydraulic cylinder. Furthermore, there is provided a hydraulically operable mechanism with the aid of which the piston rod of the hydraulic cylinder to be repaired can be loosened. The device concerned displays only a low degree of mechanization and automation, respectively, and is not suitable for the assembly or disassembly of hydraulic cylinders with large dimensions, in particular for use of the same in construction machinery.

The U.S. Pat. No. 3,900,938, establishing the generic clause, displays a service device for the assembly and disassembly of hydraulic cylinders, comprising a pedestal-like machine frame in the form of a table, with said frame having horizontally arranged guide means.

As a guide thereof, there is used a metal section that is enclosed in shoe-like manner by a receptacle for the cylinder barrel of the hydraulic cylinder, at least one receptacle for a support and a receptacle for a tool.

In addition thereto, there is provided a holder for fixing the piston rod of the hydraulic cylinder.

Upon fixation of the hydraulic cylinder that has been introduced into the device for servicing, it is possible to effect rotational movement of the cylinder barrel by means of a hydraulic lever drive, so that a retaining ring can be loosened with the aid of the tool receptacle and, following this, the piston and the piston rod can be removed from the cylinder. Outflowing hydraulic oil can be collected by a tray-like container underneath the machine frame.

The receptacle for the cylinder barrel is adjustable in the direction of the longitudinal axis by means of a hydraulic spindle drive so that hydraulic cylinders with different dimensions in length can be assembled and disassembled.

Owing to the type of the hydraulic drive according to U.S. Pat. No. 3,900,938, loosening of the retaining nut on the hydraulic cylinder can be carried out in several steps only, i.e. with large expenditure in time. Defined control of the tightening torque in assembling corresponding cylinders is not possible, which thus entails a risk in the subsequent intended operation of the hydraulic cylinders in corresponding machinery and equipment.

On the basis of the situation outlined hereinbefore, it is thus an object of the present invention to indicate a further developed apparatus for assembly and disassembly of hydraulic cylinders, in particular hydraulic cylinders with very large dimensions, which has a high degree of mechanization and automation and which, in particular in assembling overhauled cylinders, ensures reproducible conditions in accordance with manufacturers' specifications.

The apparatus to be created is to be designed such that it can be used without great expenditure immediately in repair shops and corresponding service companies. In addition, use of the apparatus should also be possible on building sites, without necessitating comprehensive measures for use of the same to be planned or provided in advance.

The object of the invention is met by an apparatus for the assembly and disassembly of hydraulic cylinders according to the feature combination indicated in claim 1, with the dependent claims comprising at least expedient embodiments and further developments.

Accordingly, the invention starts from an apparatus for the assembly and disassembly of hydraulic cylinders, which consists of a pedestal-like machine frame forming a machine bed.

The machine frame or machine bed has horizontally arranged guide means. These guide means bear a receptacle for the cylinder barrel of the hydraulic cylinder, at least one receptacle for a support and a receptacle for a tool. Moreover, there is provided a holder or fixture for fixing the piston rod of the respective hydraulic cylinder.

According to the invention, the holder for fixing the piston rod has a centering carriage which is driven by a centering spindle. This centering carriage comprises a piston rod receptacle. The holder itself is designed to be rotatable about the longitudinal axis of the machine frame, with the rotational movement being realized by means of a torque-controlled electromechanical drive.

By way of the centering according to the invention, by means of a centering spindle and a centering carriage, it is possible to effect very exact positioning of the hydraulic cylinder to be overhauled in the apparatus, without there arising forces that could lead to damage of the cylinder barrel inner wall and/or of the piston or piston rod.

With the aid of the inventive torque control of the electromechanical drive, it is possible to set, detect and control both the forces in releasing and in tightening nuts or other frictional connections. This ensures high quality as well as damage-free overhauling of the cylinders along with corresponding assembly of the same.

In a further development of the invention, the displaceable or slidable receptacle for the cylinder barrel has a centering carriage driven by an additional centering spindle, with the displaceability being realized in the direction of the longitudinal axis of the machine frame.

With regard to this embodiment, both the cylinder barrel and the piston rod can be centered, and it is possible to provide for adaptation to different configurations of the hydraulic cylinders as regards the length and diameter of the same.

The tool receptacle in a further development according to the invention comprises a sliding carriage with supporting arms.

The supporting arms either form a slot-shaped recess or have a receiving part with such a recess, so that holding of a tool in exchangeable manner is rendered possible. By way of the slot-shaped recess, the corresponding tool with the tool dimensions matched to the hydraulic cylinder can easily be inserted and removed, in particular from above.

The corresponding tool has a shaped part or an opening, formed in particular as a wrench surface for loosening the piston rod nut.

The holder for fixing the hydraulic cylinder, according to the solution of the present invention, is fixedly located at the machine frame, and in particular is threadedly connected to said frame. An alternative possibility consists in designing the holder for fixing the hydraulic cylinder to be in fact lockable, but to be also rotatable upon releasing a locked state. Such a possibility of rotating the hydraulic cylinder about the longitudinal axis of the same permits a transfer of the cylinder along with the possibly provided hydraulic connections thereof into an optimum position at an installer or operator, allowing the same to perform all necessary operations without changing his or her position with respect to the apparatus.

All forces occurring in assembly and disassembly can thus be easily be discharged into and taken up by the machine frame. The machine frame is of self-supporting and statically non-deforming design. Due to the self-supporting design of the machine frame, it is possible to use the same on conventional solidified floors. Anchoring of the apparatus e.g. in in-situ concrete is not necessary.

The electromotive, torque-controlled drive may comprise a geared motor and a corresponding electronic control cooperating with a torque sensor system that detects and evaluates the forces and moments occurring between tool and hydraulic cylinder.

When using torque-controlled electromotive drives, it is of course possible to realize a maximum moment setting in order to exclude mechanical destruction in case of stuck frictional connections.

The already mentioned receptacle for the cylinder barrel and the receptacle for the tool are slidingly movable or displaceable by means of an additional electromotive drive, which is in the form of a motion drive. Manual adjustment or displacement can be dispensed with in this regard.

The displaceability is realized by way of a roller or sliding guide provided around or at the machine frame, which prevents also tilting and is capable of absorbing the forces occurring during assembly and disassembly, respectively. In particular the roller guide permits also manual displacement of the position of the hydraulic cylinder with respect to the piston and piston rod, as the frictional forces to be overcome a very low. Upon disassembly of piston and cylinder by pulling these components apart, the safety at work is increased due to the advantageous roller guide.

The at least one support provided for the cylinder barrel and/or the piston rod is/are designed to be adjustable in height. This adjustment in height can be realized with the aid of a circumferential worm thread. As an alternative it is also possible to make use of a threadedly inserted worm for height adjustment. Hydraulic height adjustment is possible as well.

Figure 2:
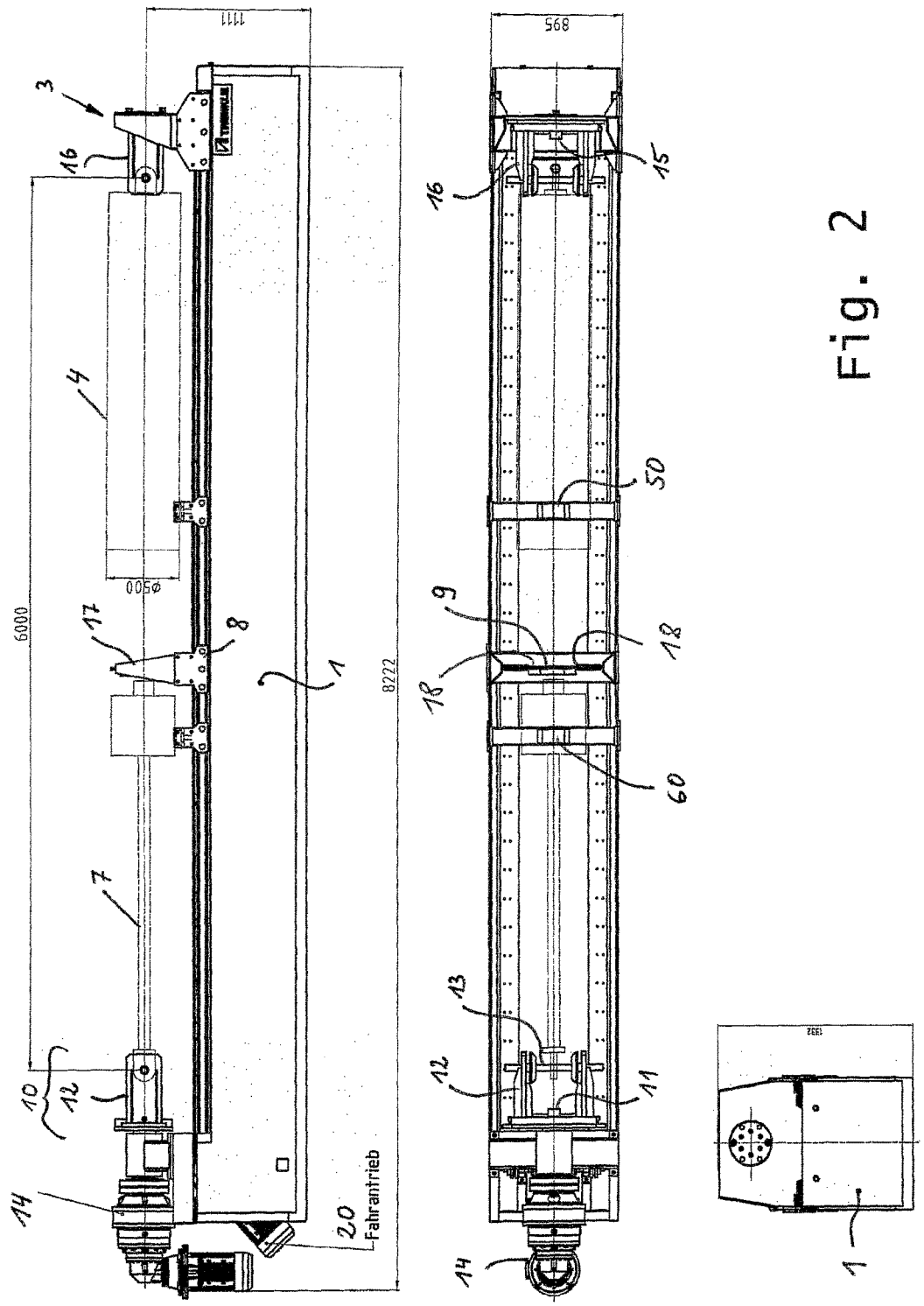
Figure 3:
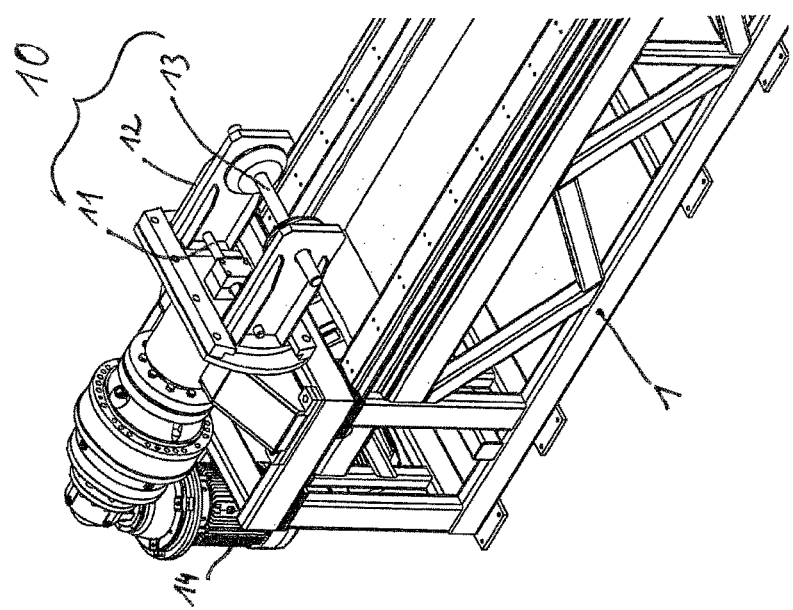

The invention shall be explained in more detail hereinafter by way of an embodiment and with the assistance of the drawings in which:

FIG. 1 shows a perspective view of the apparatus according to the invention for assembly and disassembly of hydraulic cylinders;

FIG. 2 shows a longitudinal side view, a plan view and a face side view of the apparatus according to the invention, illustrating in broken lines the piston rod along with the piston and the cylinder of an already disassembled hydraulic cylinder; and FIG. 3 shows a perspective detailed view looking at the holder for receiving the piston rod, along with the centering spindle, centering carriage and piston rod receptacle.

The apparatus according to the invention, as illustrated in FIGS. 1 to 3, is based firstly on a pedestal-like machine frame 1 that is of self-supporting and non-anchoring design. At or in the machine frame 1, there are provided horizontally arranged or horizontally extending guide means 2.

These guide means bear a slidingly movable or displaceable receptacle 3 for the cylinder barrel for (cf. FIG. 2) of the respective hydraulic cylinder to be overhauled, a receptacle 5 as support for the cylinder barrel as well as a receptacle 6 as support for the piston rod of the hydraulic cylinder to be overhauled.

The piston rod is assigned numeral 7 in FIG. 2.

Moreover, there is provided a receptacle 8 for a tool 9, and a holder 10 is formed for fixing the piston rod 7 of the hydraulic cylinder.

The holder 10 for the piston rod 7 shall be explained in more detail by way of FIG. 3.

The holder comprises a centering carriage 12 which is driven by a centering spindle 11 and has a piston rod receptacle 13.

By way of an optional bearing, it is possible to rotate the holder 10 about the longitudinal axis of the machine frame 1, entraining the piston rod 7 mounted in the piston rod receptacle 13 (cf. FIG. 2).

The rotational movement is realized by way of a torque-controlled electromotive drive 14.

The displaceable receptacle 3 for the cylinder barrel 4 also comprises a centering carriage 16 that is driven by an additional centering spindle 15, with the displaceability being provided in the direction of the longitudinal axis of the machine frame 1.

The tool receptacle 8 is constituted by a sliding carriage with supporting arms 17 that form a slot-shaped recess 18 for holding the tool 9 in exchangeable manner. The slot-shaped recess 18, however, can also accommodate an adapter for receiving already existing tools, such as e.g. special nuts, in order to thus avoid the manufacture of expensive special tools.

As can be seen in FIG. 1, the tool 9 has a shaped part in the form of a wrench surface 19. The holder 16 for fixing the hydraulic cylinder 4 is fixedly located at the machine frame 1, and in particular is threadedly engaged with the same, but is rotatable about its own axis upon release of a locking means.

The receptacle 3 for the cylinder barrel 4 and the receptacle 8 for the tool 9, and optionally also the supports 5 and 6, can be displaced relatively to each other in longitudinal direction and positioned by way of an electromotive motion drive 20.

For providing the displaceability, there are formed corresponding roller or sliding guides 2 in or at the machine frame 1.

The supports 5 and 6, having receiving surfaces 50 and 60, respectively, are designed such that the receiving surfaces or receiving elements are adjustable in height.

The machine frame 1 is designed as a massive, self-supporting steel beam or steel frame construction and is suitable to safely take up all forces occurring during operation of the apparatus, without distortion or changes in position of the essential components of the apparatus taking place.

With the aid of the centering carriages, it is possible to effect very accurate positioning and positional association of cylinder barrel and piston rod, so that exact, damage-free assembly and disassembly of the respective hydraulic cylinders to be overhauled is rendered possible. The opening formed by the spaced-apart recess for receiving the tool proper, created by the supporting arms, can be used, while the tool 9 is at first removed, for separating the piston along with the piston rod from the cylinder barrel with the aid of the motion drive. Thereafter, the tool 9 is inserted and the tool carriage along with the tool is moved to a position permitting the piston rod nut to be moved towards the wrench surface of the tool in order to then remove the piston nut by activation of the torque-controlled drive. Upon e.g. overhauling of the piston, assembly takes place in reverse manner, wherein due to the free accessibility with regard to removal of the tool from the carriage, working without removal of cylinder barrel and/or piston rod from the apparatus is conceivable.

The invention claimed is:

1. An apparatus for the assembly and disassembly of hydraulic cylinders, composed of a pedestal-like machine frame (1) which has horizontally arranged guide means (2) which bear, in displaceable manner, a receptacle (3) for the cylinder barrel (4) of the hydraulic cylinder, at least one receptacle (5; 6) for a support (50; 60) and a receptacle (8) for a tool (9), and furthermore having a holder (10) for fixing the piston rod (7) of the hydraulic cylinder,
characterized in that
the holder (10) for fixing the piston rod (7) has a centering carriage (12) which is driven by a centering spindle (11) and which comprises a piston rod receptacle (13), wherein the holder is designed to be rotatable about the longitudinal axis of the machine frame (1) and the rotational movement is realized by means of a torque-controlled electromotive drive (14).

2. The apparatus according to claim 1,
characterized in that
the displaceable receptacle (3) for the cylinder barrel (4) has a centering carriage (16) driven by an additional centering spindle (15), with the displaceability being realized in the direction of the longitudinal axis of the machine frame.

3. The apparatus according to claim 1,
characterized in that
the tool receptacle comprises a sliding carriage (8) with supporting arms (17) having a slot-shaped recess (18) for holding the tool (9) in exchangeable manner.

4. The apparatus according to claim 3,
characterized in that
the tool (9) has a shaped part or opening, formed as a wrench surface (19), or for receiving a tool adapter.

5. The apparatus according to claim 1,
characterized in that
the holder (16) for fixing the hydraulic cylinder (4) can be connected to the machine frame (1) in force-dissipating manner.

6. The apparatus according to claim 1,
characterized in that
the electromotive drive (14) comprises a geared motor.

7. The apparatus according to claim 1,
characterized in that
the electromotive drive (14) comprises a torque sensor system with respect to the forces or moments occurring between tool (9) and hydraulic cylinder.

8. The apparatus according to claim 1,
characterized in that
the receptacle (3) for the cylinder barrel (4) and the receptacle (8) for the tool (9) are displaceable by means of an electromotive motion drive (20).

9. The apparatus according to claim 8,
characterized in that
for said displaceability, there are formed roller or sliding guide grooves in or at the machine frame (1).

10. The apparatus according to claim 1,
characterized in that
the at least one support (50; 60) is adjustable in height.

11. The apparatus according to claim 1,
characterized in that
the machine frame (1) is of self-supporting and non-anchoring design.

* * * * *